(12) United States Patent
Wanner

(10) Patent No.: US 11,441,527 B2
(45) Date of Patent: Sep. 13, 2022

(54) STARTER DEVICE FOR INTERNAL COMBUSTION ENGINES AND METHOD FOR OPERATING SAME

(71) Applicant: Robert Bosch GmbH, Stuttgart (DE)

(72) Inventor: Hartmut Wanner, Herrenberg (DE)

(73) Assignee: Robert Bosch GmbH, Stuttgart (DE)

(*) Notice: Subject to any disclaimer, the term of this patent is extended or adjusted under 35 U.S.C. 154(b) by 173 days.

(21) Appl. No.: 16/772,988

(22) PCT Filed: Dec. 5, 2018

(86) PCT No.: PCT/EP2018/083598
§ 371 (c)(1),
(2) Date: Jun. 15, 2020

(87) PCT Pub. No.: WO2019/121003
PCT Pub. Date: Jun. 27, 2019

(65) Prior Publication Data
US 2020/0392931 A1    Dec. 17, 2020

(30) Foreign Application Priority Data
Dec. 18, 2017 (DE) .......................... 102017223106.8

(51) Int. Cl.
*F02N 11/08* (2006.01)
*F16H 1/06* (2006.01)
*H02K 7/00* (2006.01)

(52) U.S. Cl.
CPC ........ *F02N 11/0851* (2013.01); *F02N 11/087* (2013.01); *F02N 11/0862* (2013.01); *F16H 1/06* (2013.01); *H02K 7/006* (2013.01)

(58) Field of Classification Search
CPC .. F02N 11/0851; F02N 11/855; F02N 11/087; F02N 15/067
(Continued)

(56) References Cited

U.S. PATENT DOCUMENTS 4,551,630 A * 11/1985 Stahura ............... F02N 11/0851
123/179.3
5,563,563 A * 10/1996 Freitas ..................... H01H 1/04
335/126
(Continued)

FOREIGN PATENT DOCUMENTS

DE     3737430 A1   6/1988
DE    19814504 A1   6/1999
(Continued)

OTHER PUBLICATIONS

Google machine translation of DE102004032373A1.*
International Search Report for PCT/EP2018/083598, dated Feb. 19, 2019.

*Primary Examiner* — Phutthiwat Wongwian
*Assistant Examiner* — Arnold Castro
(74) *Attorney, Agent, or Firm* — Norton Rose Fulbright US LLP; Gerard Messina

(57) ABSTRACT

A starting apparatus for internal combustion engines, having a drive pinion for engagement into a ring gear of the internal combustion engine, an electrical rotary actuator and an electrical linear actuator, the rotary actuator to rotate the drive pinion and the linear actuator to slide a pinion, and the electrical linear actuator having a linear-stroke magnet that has a sliding armature is moved by a retraction winding, within the retraction winding, along a sliding armature axis, having a holding winding by which the sliding armature can be held in a retracted state. The linear actuator also actuates a switching apparatus to activate the electrical rotary actuator into a second actuation stage. A second retraction winding is connected in parallel with the first retraction winding, such that the first retraction winding can be shut off by a normally closed switch while a current path through a second retraction winding is closed.

12 Claims, 4 Drawing Sheets

(58) Field of Classification Search
USPC .................................. 123/179.26; 290/38 R
See application file for complete search history.

(56) References Cited

U.S. PATENT DOCUMENTS

| | | | | |
|---|---|---|---|---|
| 5,617,758 A * | 4/1997 | Nishida | ................. | F02N 15/066 74/7 B |
| 5,818,679 A * | 10/1998 | Schustek | ............... | F02N 11/087 361/154 |
| 6,806,585 B2 * | 10/2004 | Park | ..................... | F02N 11/087 123/179.3 |
| 6,930,409 B1 * | 8/2005 | Smith | .................. | H02J 7/0034 307/127 |
| 8,362,862 B2 * | 1/2013 | Bradfield | .............. | F02N 11/087 335/268 |
| 2002/0158519 A1 * | 10/2002 | Fulton | .................. | F02N 11/087 310/14 |
| 2004/0020315 A1 * | 2/2004 | Vilou | ................... | H01H 51/065 74/7 A |
| 2008/0283012 A1 * | 11/2008 | Wanner | .................. | F02N 11/00 123/179.25 |
| 2010/0127808 A1 * | 5/2010 | Wanner | .................. | H01F 7/123 335/268 |
| 2011/0115238 A1 * | 5/2011 | Biessenberger | ...... | F02N 15/067 290/38 R |
| 2011/0202264 A1 * | 8/2011 | Sengebusch | .......... | F02N 15/067 701/113 |
| 2011/0273811 A1 * | 11/2011 | Plaideau | ............... | F02N 11/087 361/139 |
| 2012/0086219 A1 * | 4/2012 | Wanner | ................... | F02N 15/10 290/38 C |
| 2012/0104769 A1 * | 5/2012 | Wanner | ............... | F02N 11/0851 290/38 C |
| 2013/0221683 A1 * | 8/2013 | Bradfield | ............ | F02N 11/0851 290/38 R |
| 2014/0009018 A1 * | 1/2014 | Bradfield | ................ | B60L 15/20 310/83 |
| 2014/0345554 A1 * | 11/2014 | Plaideau | ................ | F02N 11/087 123/179.3 |
| 2020/0312596 A1 * | 10/2020 | Ono | ........................ | H01H 50/44 |
| 2020/0392931 A1 * | 12/2020 | Wanner | ................... | H02K 7/006 |

FOREIGN PATENT DOCUMENTS

| | | |
|---|---|---|
| DE | 102004032373 A1 | 1/2006 |
| DE | 102005006248 A1 | 8/2006 |

* cited by examiner

STARTER DEVICE FOR INTERNAL COMBUSTION ENGINES AND METHOD FOR OPERATING SAME

BACKGROUND INFORMATION

Starters that have a comparatively high power output are used in commercial vehicles. Stringent requirements are imposed regarding the service life of such starters. This means in particular that wear on the pinion or starter pinion of the starter and on the ring gear of the internal combustion engine should or must be minimized. In most cases, electrically two-stage engagement systems must be used to achieve this.

The reason for this is that with single-stage starter systems, upon engagement of the pinion into the ring gear, a predominant proportion of so-called tooth-on-tooth points occur, which are then resolved, for system-related reasons, only with a large axial force on the part of the engagement relay or of the engagement spring (if one is installed) located between them, and in conjunction with a large starting torque. The large starting torque results in a large tangential force on the teeth of the pinion and ring gear. All of this causes a relatively high level of mechanical wear. For that reason, the aforementioned two-stage engagement systems are used. In that context, for example, during pre-engagement of the pinion it too is rotated. A relatively small current flows through the electric starter motor for that purpose. This first engagement stage thus increases the probability that the pinion teeth will be able to engage into the gaps of the ring gear.

In order to achieve low wear on the pinion and ring gear, and nevertheless to allow an electrically and thermally suitable and reliable design, a so-called two-chamber winding has for years been used in various starter models that are marketed by Robert Bosch GmbH for commercial vehicles. Among the aforementioned starter models are models HEF95-L, HXF-95L, HEF 109-M, HEF 109-MP, HEF109-L, and the HEP parallel starter versions thereof. With these starter models, a winding assemblage as described in German Patent Application No. DE 10 2004 032 373 A1 is located in the engagement relay. The winding assemblage described in this document is referred to by specialists as a "dual-chamber winding." A retraction winding is energized at the beginning of the starting operation and conveys the so-called rotation current, during the engagement operation (first stage), to the starter motor, which can then easily be caused to rotate. By way of a so-called normally closed contact, this retraction winding is then shut off when the so-called main-current switch (sometimes also referred to as a contact plate) is lifted away from the normally closed contact by the progress of the magnet armature in the engagement relay. The dual-chamber winding furthermore has a holding winding that applies the actual magnetic retraction forces but also holds the magnet armature securely in the working position once the retraction winding is shut off. Most of the magnetic retraction force is generated by the holding winding (approx. 6000 ampere-turns); the magnetic force of the retraction winding, by comparison, is comparatively low (approx. 1000 ampere-turns).

As compared with a previously usual winding assemblage having a so-called serpentine winding (cf. for example, German Patent Application No. DE 198 14 504 A1), the version having a retraction winding and a holding winding offers considerable functional advantages, but the holding winding can nevertheless be further optimized. For example, the magnetic pulling forces are limited as a result of the design. It is a compromise solution between maximum magnetic pulling force and the thermal stability of the winding, so that the maximum permissible activation time is limited. Further optimization of the achievable dynamic engagement depth or of the temperature function limit would be accompanied by a reduction in the thermal stability of the winding system. The "dynamic engagement depth" is the depth attained by the pinion or starter pinion in the tooth set of the ring gear by the time the main current switch closes.

In particular when the electric motor in starting apparatuses is enlarged for higher power outputs, the possible activation time of the electric motor becomes extended as compared with lower-output motors by, for example 50% to 80%; but the temperature capacity has different values on different internal combustion engines and, in some combinations, reaches its limits, or the winding assemblage in the engagement relay represents the limiting element, so that its maximum permissible operating temperature is reached.

SUMMARY

One object of the present invention is optimization of the characteristic values that correlate with the magnetic pulling forces in the engagement relay and the maximum possible activation time. It must be considered, in this context, that the starting behavior of the electric motor or starter motor, i.e., its characteristic curve as the internal combustion engine is turned over via the ring gear, be as useful as possible. A further object is to optimize material utilization, so that outlay, for example, for copper wire for the winding assemblage is maximally optimized.

According to a first aspect of the present invention, provision is made that the starting apparatus, having a drive pinion for engagement into a ring gear of an internal combustion engine, is configured so that said pinion is rotatable by an electrical rotary actuator and axially displaceable by an electrical linear actuator. The electrical linear actuator has a linear-stroke magnet that has a sliding armature that is movable, by a combination of various windings, within those windings. In this case retraction windings are installed which are energized only during the retraction operation. The linear actuator furthermore has a holding winding by which the sliding armature can be held in a retracted state. The linear actuator also serves to actuate a switching apparatus by way of which the electrical rotary actuator can be activated. Provision is made that in addition to the one, first, retraction winding, a second retraction winding is present which is connected in parallel with the first retraction winding.

Three windings are therefore present in the linear actuator. The result of this is that a retraction winding and a holding winding, which are connected in parallel with one another and act co-directionally and in parallel, are present for the requisite high pulling force for the retraction operation of the sliding armature and for sliding the drive pinion. During a first phase of operation of the starting apparatus, the very high rotation current for the electrical rotary actuator flows through a comparatively low-impedance retraction winding in the linear actuator. Because this first retraction winding in the linear actuator has a relatively small magnetic effect, it can be co-coupled or counter-coupled with the holding winding and with the other, second, retraction winding, in order to influence—and, depending on the design, optimize—the dynamics of the linear actuator and thus the motion of the sliding armature in the linear actuator. As the linear actuator continues to operate, a normally closed switch becomes actuated, i.e., opened, so that after a first time period of, for example, approximately 50 milliseconds to 70 milliseconds, a rotation current is or can be shut off, and a magnetic pulling force on the sliding armature thus is or can be generated only by the second retraction winding and the holding winding.

After a second time period subsequent thereto, the assemblage makes it possible for the second retraction winding to be electrically shut off. This second time period lasts, for example and typically, approximately 10 to 20 milliseconds. The shutoff of the second retraction winding is in fact a short circuit of the second retraction winding, since as a result of the closing of the main current contacts, a winding starting point of the second retraction winding and a winding end point of the second retraction winding are at almost the same electrical potential, so that while a minimal current flows through the second retraction winding, it in fact produces no practical benefit. The second retraction winding therefore has almost no further magnetic effect. The holding force for the sliding armature is thus generated practically only by the holding winding. As compared with conventional embodiments of such linear actuators or starter relays, however, in this situation a considerably reduced electrical current flows through the holding winding. It can be decreased, for example, by approximately 40%. This consequently makes possible an extended maximum possible activation time of the linear actuator, since because of the reduced current, the heating of the overall linear actuator is also considerably reduced. The user of such a starting apparatus thus has the opportunity to exploit the entire thermal potential of the electrical rotary actuator.

One design condition for the shutoff of the linear actuator is that a number of windings of the holding winding be approximately equal to the number of windings of the second retraction winding. Otherwise a linear actuator of this kind can be activated but cannot then be shut off.

Optimization of the various parameters of the windings makes possible a winding system that has the following properties:

Compared with conventional systems having a dual-chamber winding, a linear actuator optimized in this fashion produces an elevated temperature limit at which overall functionality is reliably achieved. The temperature limit can be raised approximately 10% by way of an optimized system of this kind.

An activation time can be considerably lengthened with this new system, since a power loss of the holding winding is reduced as compared with previous systems having a dual-chamber winding. Depending on the operating mode, the possible lengthened activation time is up to 60% longer than before. The existing characteristics of the rotation current, i.e., for example the current level and activation time during the first stage, can be retained. If such linear actuators are utilized in conventional starting apparatuses, for example in combination with the conventional HEF109-M or HEF109-L starting apparatuses, a so-called starting behavior, and thus a service life, of the starters or starting apparatuses is not negatively influenced.

As compared with a previous system having a dual-chamber winding, a so-called copper utilization weight can be reduced by approximately 15% of copper. The copper utilization weight corresponds to the total mass of copper in the holding winding and in the second retraction winding. The first retraction winding is produced, for example, from a special resistance alloy and is therefore not taken into account in the copper utilization weight.

According to a further aspect of the present invention, provision is made that with the electrical linear actuator in an activated position, a main current switch of the switching devices is closed, and the normally closed switch of the switching device is open. This has the advantage that an appreciable current flows briefly through the electrical rotary actuator while the normally closed switch is closed and simultaneously energized, with the result that the rotary actuator causes the drive pinion to rotate. The rotation of the drive pinion during this phase is not too intense, so that during the simultaneous energization of the holding winding and the second retraction winding, the linear actuator simultaneously slides the drive pinion toward the ring gear of the internal combustion engine and, in interaction with the translational and rotational motion of the drive pinion, it is highly probable that a position with respect to the ring gear will be reached such that a tooth of the tooth set of the drive pinion penetrates into a gap in the tooth set of the ring gear. The ultimate result is to prevent a drive pinion, abutting against the tooth set of the ring gear, from rotating with high starting dynamics, and consequently at a high rotation speed, along the tooth set of the ring gear, in that context constantly penetrating with the teeth of the drive pinion into the gaps in the tooth set of the ring gear but also being repeatedly slid out of those gaps in the tooth set of the ring gear. This process of repeatedly being slid out and penetrating slightly into the tooth set of the ring gear results in a noisy rattle, which is an audible indication that the tooth set of the drive pinion and the tooth set of the ring gear are causing considerable wear on one another. Even if this process lasts in some cases only fractions of a second, disproportionately high wear is generated over the useful lifetime of the starting system.

According to a further aspect of the present invention, provision is made that when the normally closed switch of the switching device is opened, a current path to the first retraction winding is opened.

According to a further aspect of the present invention, provision is made that when the normally closed switch is opened, a current path through the second retraction winding is closed. This has the advantage that with a co-directional winding of the holding winding and second retraction winding, further penetration of the drive pinion into the ring gear of the internal combustion engine is assisted by those two windings.

According to a further aspect of the present invention, provision is made that the holding winding is wound in the same direction as the second retraction winding, and the first retraction winding is likewise wound in the same direction, i.e., all three windings are wound in the same winding direction. The effect achieved is that when the first retraction winding is shut off, the sum of the total magnetic field of the three windings becomes weaker. This has the advantage that ultimately the dynamics of this linear actuator, and here in particular of the sliding armature, are adapted to the modified situation. In other words, the sliding armature that is now in motion no longer needs to be moved out from complete inertia (idle state), and can thus also continue to be moved with less sliding energy. This means, for instance, that what is achieved with such an assemblage is that the sliding armature does not come to such an abrupt stop against the magnetic yoke of the linear actuator, and less noise is therefore generated.

Upon shutoff of the first retraction winding, which accounts for approximately 15% of the total flux, a counter-induction occurs in the other two coils (holding winding and second retraction winding) through which current is flowing.

This means that a current through the two coils (holding winding and second retraction winding) briefly becomes somewhat elevated due to the collapsing magnetic field in the first retraction winding. Further advantages are the elevated temperature function limit, since even when the copper windings are at a high temperature, the magnetic linear actuator is additionally magnetically assisted by the first retraction winding, but the rotation time of the pinion is also thereby shortened so that, depending on the rotation behavior of the electric motor part, the engagement behavior can be optimized.

According to a further embodiment of the present invention, provision is made that the first retraction winding is wound in the opposite direction from the second retraction winding, and also in the opposite direction from the holding winding. This has the advantage that as a result of the decaying magnetic field of the first retraction winding, the net value of the total magnetic flux, constituting the sum of the flux through the second retraction winding and through the holding winding, is intensified, i.e., additionally accelerated, once the rotation and engagement operation is completed with high probability. Depending on the rotation behavior of the electric motor part, this configuration can offer advantages in terms of coordinating the duration of the engagement operation and the subsequent pulling behavior.

In the example embodiment of the present invention having three partial windings, the distribution is approximately such that the holding winding has approximately 2800 ampere-turns, and thus applies approximately 45% of the retraction force and 100% of the holding force. The first retraction winding has approximately 1000 ampere-turns, and decelerates the retraction function of the second retraction winding and the holding winding by about 1000 ampere-turns in the first approximately 70 ms, and supplies the rotation current. The second retraction winding has approximately 3300 ampere-turns and supplies approximately 55% of the retraction force.

One of the principal advantages achieved, both with a first retraction winding that is wound in the same and with one wound in the opposite direction, is that ultimately three different windings participate in the generation of the sliding force, and ultimately are shut off in stages. The result of this staged shutoff is that in terms of the motion state of the sliding armature, the individual retraction windings are, as necessary, shut off, or are practically ineffective, one after another. This ultimately makes possible a dimensioning of the holding winding which is adapted to requirements and is decreased overall, i.e., this holding winding, which generates the holding force during the turnover phase of the internal combustion engine, requires less than half the original mass—i.e., the copper mass through which current flows—compared with a holding winding previously used. The second retraction winding that is nevertheless provided can be embodied with a reduced copper mass, since it becomes energized only briefly during the retraction operation.

A further aspect of the present invention is that the linear actuator has a coil carrier, the first retraction winding being disposed in a first annular cross section of a winding volume of the coil carrier, and the second retraction winding being disposed in a second annular cross section of a winding volume of the coil carrier and preferably surrounding the first retraction winding with a portion of the annular cross section, the holding winding being disposed in a third annular cross section of the winding volume of the coil carrier and surrounding both the first retraction winding and the second retraction winding. This has the advantage that the winding that is energized for the longest time during the overall engagement and rotation process of the starting apparatus can use the second retraction winding, after it has been effectively shut off, as a heat sink, and at the same time can also dissipate heat via the housing of the linear actuator.

Further advantages are evident for the example method according to the present invention. Further advantages and useful embodiments are furthermore evident from the description herein and the figures.

BRIEF DESCRIPTION OF THE DRAWINGS

Identical reference characters refer to identical components.

DETAILED DESCRIPTION OF EXAMPLE EMBODIMENTS

Figure 1:
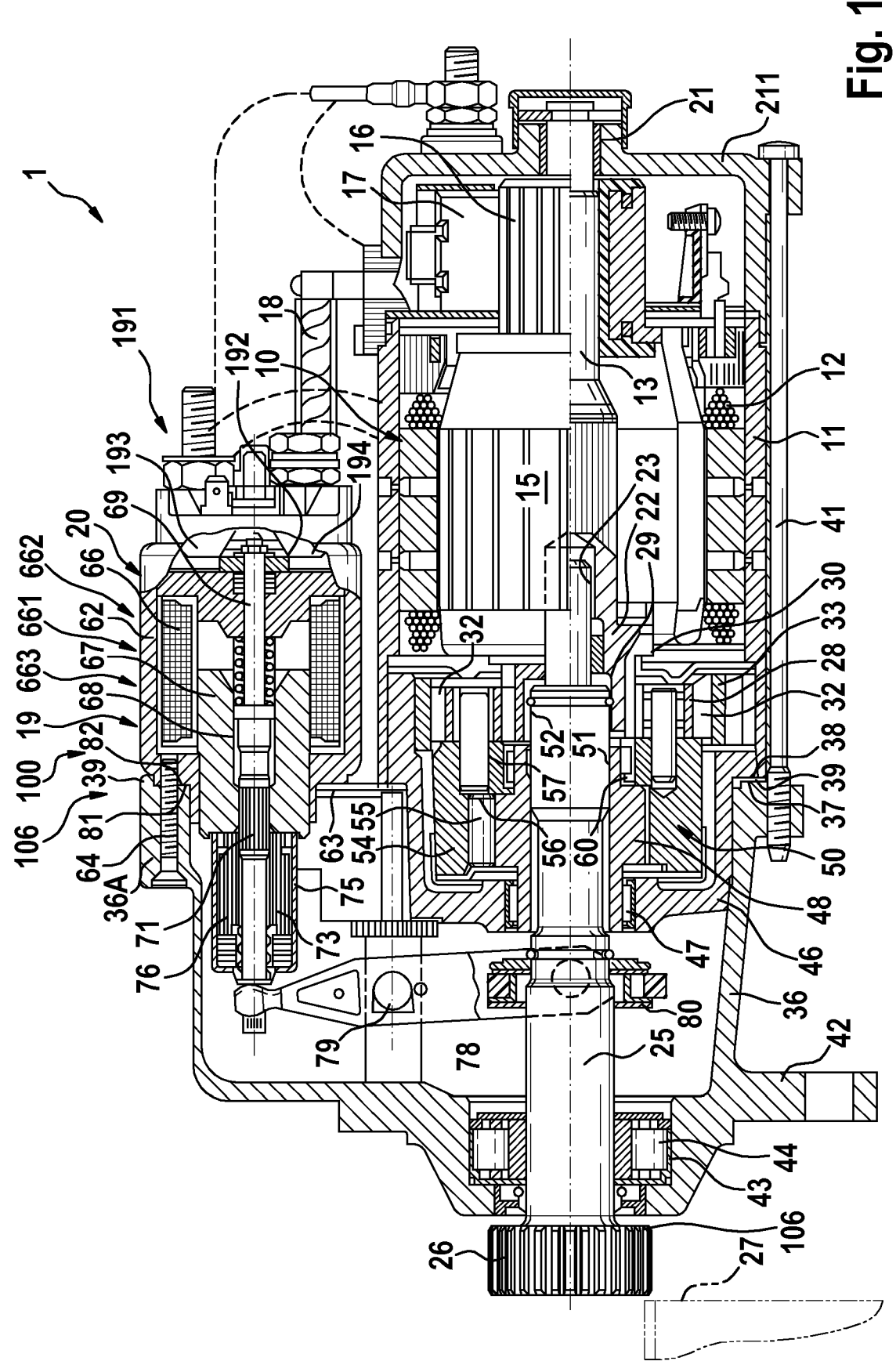
FIG. 1 depicts a starting apparatus in longitudinal section in accordance with an example embodiment of the present invention.

FIG. 1 depicts a starting apparatus 1 in longitudinal section. This starting apparatus 1 has a rotary actuator 10 having a pole housing 11. An exciter winding 12 is disposed in pole housing 11. Rotary actuator 10 drives, with its armature 15, an armature shaft 13 that carries a collector 16. Abutting against collector 16 are sliding contacts 17 that are often also referred to as "carbon brushes." Sliding contacts 17 are powered, or powered during operation, via an electrical lead-in 18. Sitting above pole housing 11 is an engagement relay that has a linear actuator 19 and a switching apparatus 191. Armature shaft 13 is mounted, with its commutator-side or collector-side end, in a commutator bearing 21 of a commutator bearing cover 211. At its other end, commutator shaft 13 has a configuration that constitutes a sun gear and engages into the planetary gearset having roller freewheel 50. Projecting into the latter is a coarse thread of output drive shaft 25, which has at its external other end a drive pinion 26. As a variant, a separate pinion can also be connected via a longitudinal tooth set to output drive shaft 25. The pinion can be brought, by corresponding displacement of output drive shaft 25, into engagement with ring gear 27 of the internal combustion engine that is to be started.

Located at an open end 29 of armature shaft 13 on its outer side is a longitudinal tooth set 30 that constitutes a sun gear of an intermediate transmission 28 embodied as a planetary transmission. This sun gear can also be embodied separately and placed onto a straight tooth set of armature shaft 13. Planet gears 32 mesh with the sun gear and are in turn in engagement with a stationary ring gear 33.

Adjoining pole housing 11 in an axial direction is an elongated drive bearing 36 that abuts with a collar 37 against an end surface 38 of pole housing 11. A sealing plate 39 is disposed between drive bearing 36 and pole housing 11. Drive bearing 36, pole housing 11, and collector bearing 21 are held together by tie rods 41. A rolling bearing 44 for output drive shaft 25 is disposed in a bearing plate 42 of drive bearing 36 in an orifice 43. In this exemplifying embodiment, drive pinion 6 is located outside bearing plate 42.

Located inside drive bearing 36 is an intermediate bearing 46 that receives, in a central orifice, a rolling bearing 47 in which the one part of a bushing-shaped inner ring 48 of a freewheel 50 is mounted. Embodied on an inner side of inner ring 48 is an internal coarse thread 51 into which a matching external coarse thread 52 engages at an inner end of output drive shaft 25. External coarse thread 52 is embodied to be comparatively long, so that internal coarse thread 51 and external coarse thread 52 always remain in mutual engagement even with a large displacement of output drive shaft 25.

Cylindrical rollers 55, which constitute locking elements and run on a keyway of an inner ring 48, are located between a follower 54 of freewheel 50 and inner ring 48. Follower 54 has, on its end face facing toward rotary actuator 10, several blind orifices 57 into which studs 58, which carry planet gears 32 of the planetary transmission, are pressed. A bearing 60, which can be embodied as a rolling bearing or plain bearing, is located between inner ring 48 and the outer ring, which is follower 54. Planet gears 32 are likewise mounted by way of rolling bearings (not further characterized).

Engagement relay 20 has a housing 62 that is open toward drive bearing 36. It has there a flat end surface 63 that, in this case, lies in the plane of end surface 38 of pole housing 11 and of the annular collar 37 of drive bearing 36. Drive bearing 36 has, in the region of engagement relay 20, a flange-like housing enlargement 36A through which several bolts 64 penetrate and fixedly connect housing 62 of engagement relay 20 to drive bearing 36. Sealing plate 39 extends as far as housing 62, abuts against the flat end surface 63 of housing 62, and extends as far as the outer side of enlargement 36A of drive bearing 36.

Engagement relay 20 will now be discussed. It has a coil assemblage 66 that has a retraction winding (first retraction winding 661), a second retraction winding 662, and a so-called holding winding 663. A sliding armature 67 is guided within this coil assemblage 66. This sliding armature 67 or magnet armature has a central orifice 68 in which on the one hand a switching stud 69, which carries at its end projecting out of a magnetic yoke a contact plate of switching apparatus 191, is mounted. Two contacts, which are electrically conductively connected to one another by contact plate 192, are mounted in a relay housing cover 70. The one contact is a positive-side contact 193, and the other contact is a drive-side contact 194. Fixedly disposed in orifice 68 of sliding armature 67, in axial alignment with switching stud 69, is a pusher stud 71 that projects into a displaceable plastic sleeve 73 equipped with a longitudinal slot. Fastened at the external end of sliding armature 67 is a metal sleeve 75 in which an engagement spring 76 is disposed. Pusher stud 71 acts on an engagement lever 78 that is rotatably mounted in a housing-mounted bearing 79. At its other end, this engagement lever 78 is articulated by way of an apparatus 80 on output drive shaft 25. A displacement of sliding armature 67 causes engagement lever 78 to be pivoted and output drive 25 thus to be displaced, so that drive pinion 26 is brought into engagement with ring gear 27.

As already mentioned, starting apparatus 1 has an electrical linear actuator 19. This linear actuator 19 has, as a sub-unit that has not hitherto been mentioned, a so-called linear-stroke magnet, which encompasses sliding armature 67 and whose location in linear-stroke magnet 100 is influenced, in terms of its motion dynamics and its idle position, by coil assemblage 66 and in particular by first retraction winding 661, by second retraction winding 662, and by holding winding 663.

Figure 2:
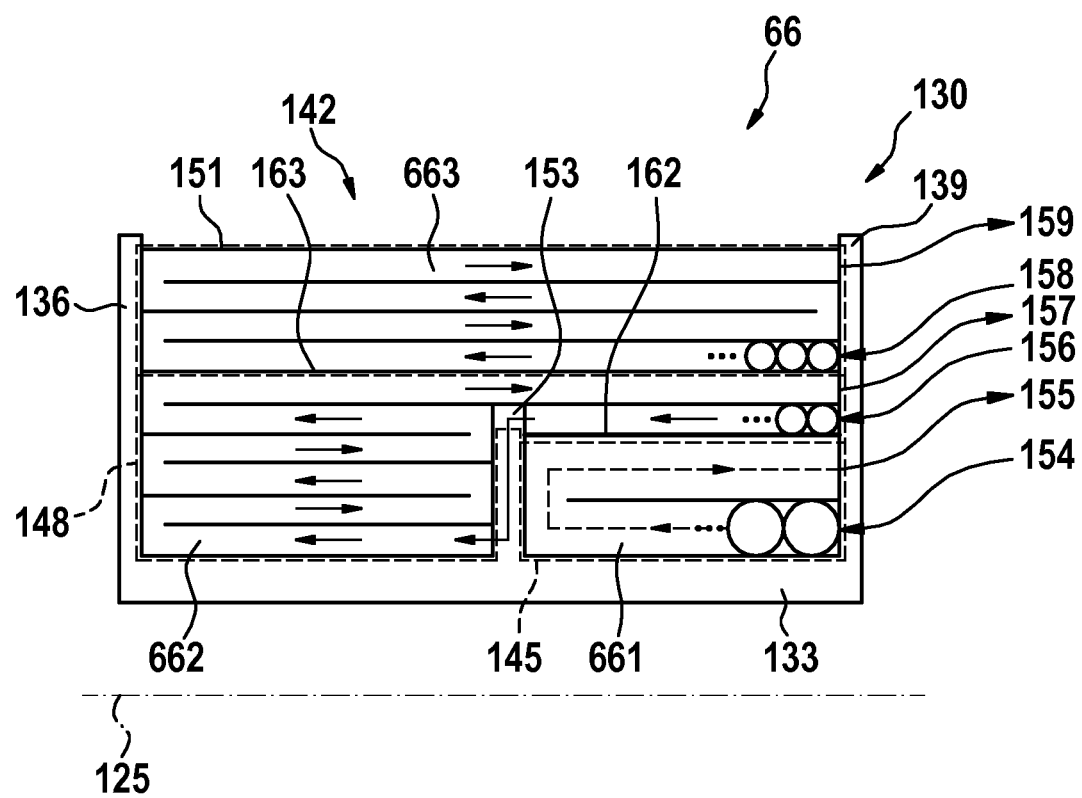
FIG. 2 is a schematic longitudinal section of a coil carrier of the linear actuator with the location of a first retraction winding, a second retraction winding, and a holding winding in accordance with an example embodiment of the present invention.

FIG. 2 is a schematic and exemplifying partial longitudinal section through coil assemblage 66. Linear actuator 106 carries, in its housing 62, a coil carrier 130 around which, i.e., around whose tubular portion 133, the three windings (first retraction winding 661, second retraction winding 662, and holding winding 663) are disposed.

Coil carrier 130 has, radially outside tubular portion 133 and between a flange 136 of the coil carrier at one end of tubular portion 133 and another flange 139 of coil carrier 130, an overall annular cross section that represents a so-called winding volume 142 (total winding volume). First retraction winding 661 is disposed in a first annular volume of winding volume 142. This first annular volume is denoted in FIG. 2 by a cross section 145. This cross section 145 is a cross section through this first annular volume. Second retraction winding 662 is disposed in a second annular volume, a winding volume that is represented by annular portion 148 and is part of the total winding volume of coil carrier 130. This second annular volume of second retraction winding 662 preferably surrounds, with part of that annular volume, first retraction winding 661. This situation is depicted in FIG. 2. In other words, the annular volume of second retraction winding 662 preferably has a cup-like shape. This cup-like shape consequently encompasses a space in which no conductor of second retraction winding 662 is disposed. First retraction winding 661 is thus disposed so as to penetrate into this space. Second retraction winding 662 thus surrounds first retraction winding 661 with part of the annular volume. Holding winding 663 is disposed in a third annular volume of winding volume 142 of coil carrier 130. Holding coil 663 surrounds both first retraction winding 661 and second retraction winding 662. Cross section 151 represents this aforementioned third annular volume. Winding volume 142 of coil carrier 130 is thus made up of the winding volumes of first retraction winding 661, of second retraction winding 662, and of holding winding 663. Particularly preferably, coil carrier 130 has an annular wall 153 between first retraction winding 661 and second retraction winding 662. Provision is also made that terminals 154, 155 of first retraction winding 661 are guided through the one flange 139. It is also the case that provision is made that terminals 156, 157 of second retraction winding 662 are likewise guided through flange 139. For holding winding 663 as well, provision is made that terminals 158, 159 are guided through flange 139. Particularly preferably, all terminals 154 to 159 thus pass through the one flange 139. "Passing through" flange 139 means that, for example, one or several slots, through which all terminals 154 to 159 pass, are provided in flange 139. In addition, an insulating layer 162 is particularly preferably disposed between retraction winding 661 and retraction winding 662. Particularly preferably, a plastic clip is applied or an adhesive tape is wound onto first insulating layer 661 for that purpose. In addition, an insulating layer 163 is particularly preferably disposed between the second retraction winding and holding winding 663, i.e., preferably is adhesively bonded onto or placed into retraction winding 662.

Figure 3:
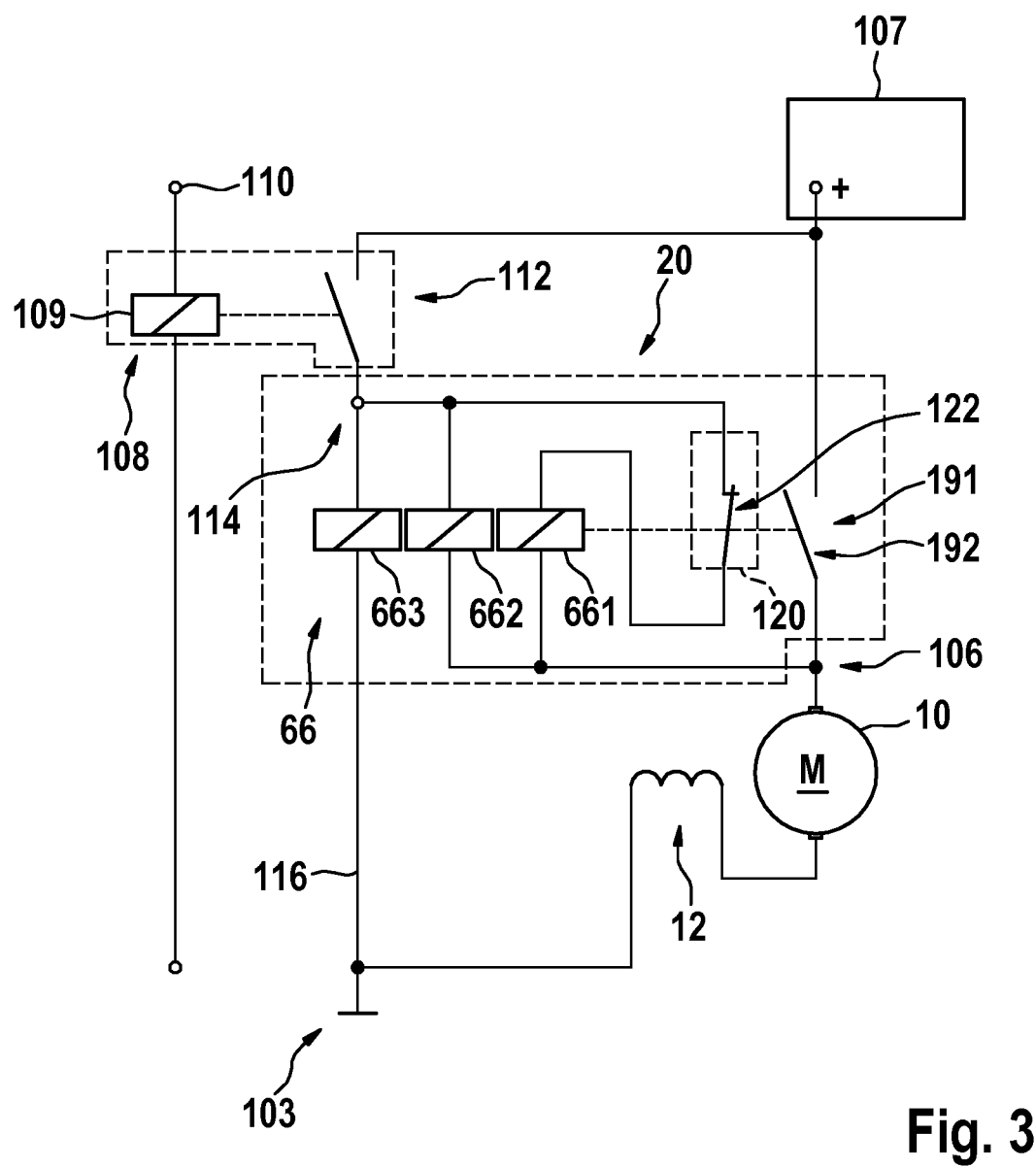
FIG. 3 is a first circuit diagram of the starting apparatus of FIG. 1.

FIG. 3 is a circuit diagram of the aforementioned starting apparatus 1 in a first exemplifying embodiment. The circuit will be described in further detail below. Rotary actuator 10 is connected, with its exciter winding 12, to a negative terminal 103. Rotary actuator 10 can be electrically connected, via a positive terminal 106 and switching apparatus 191, to a positive pole + of a starter battery 107. For that purpose, contact plate 192 of switching apparatus 191 is brought into contact with contacts 193 (positive-side contact) and 194 (drive-side contact), and the electric contact is closed. This energization via contact plate 192 takes place, however, only with the so-called second stage of energization of rotary actuator 10.

The configuration described below, and the method described, are provided for switching contact plate 192, which is part of engagement relay 20. The configuration is as follows: engagement 20 has the aforementioned coil assemblage 66, having a first retraction winding 661, a second retraction winding 662, and a holding winding 663. In this first exemplifying embodiment, all three windings have the same winding direction. Engagement relay 20 is activated by a series relay 108. A linear actuator 109 receives for that purpose, via a control terminal 110, a switch-on current that causes a relay coil (not depicted here) of series relay 108 to be energized. This energization of the relay coil of series relay 108 causes a series contact 112 to be closed. The result of this closing of series contact 112 is that an electrical connection is created between positive pole + of starter battery 107 and a coil terminal 114 of coil assemblage 66. As a result of the energization of coil terminal 114, or the application to that coil terminal 114 of the operating voltage of positive pole + of starter battery 107, both first holding winding 663 and second retraction winding 662, as well as first retraction winding 661, are energized. Holding winding 663 is directly energized from coil terminal 114. Holding winding 663 is connected via a ground connection 116 to ground terminal 103. Second retraction winding 662 is energized from coil terminal 114. Second retraction winding 662 is electrically connected on the negative side to positive terminal 106 of rotary actuator 10, so that on the negative side, the current flowing through retraction winding 662 passes via rotary actuator 10 and exciter winding 12 to ground terminal 103. An electrical connection also goes from coil terminal 114 to first retraction winding 661. This electrical connection first proceeds, however, via a normally closed switch 120 that, inter alia, is closed by series contact 112 or series relay 108 at the moment that engagement relay 20 is activated.

On the negative side, the current that flows through first retraction winding 661 is likewise taken off toward positive terminal 106. In other words, with the closing of series contact 112, in a first time period first retraction winding 661 is energized via normally closed switch 120, also second retraction winding 662 in that first time period, and also holding winding 663 over that first time period. A magnetic field is thus built up in coil arrangement 66 in this first time period, with the result that sliding armature 67 of linear actuator 19 begins to be pulled into coil arrangement 66. Switching stud 69 is actuated as a result, i.e., in this case switching stud 69 is slid by sliding armature 67 partly out of coil assemblage 66. Normally closed switch 120 remains closed until the end of this first time period. During this time period, rotary actuator 10 is appreciably energized principally through first retraction winding 661, so that during this first time period, rotary actuator 10 begins to rotate at a low power output and thereby causes drive pinion 26 to rotate. Because a sliding of drive pinion 26 toward ring gear 27 of the internal combustion engine is already occurring via engagement lever 78, drive pinion 26 thus moves, while rotating at a very low speed, in front of the tooth set of ring gear 27. When the first time period ends, normally closed switch 120 is opened. It is particularly preferred in this context that a back side of contact plate 192 hold normally closed switch 120 closed during the first time period. For example, the electrically conductive back side, and thus contact plate 192, can simultaneously be a normally closed contact 122. This first time period can last, for example, between 30 and 50 milliseconds from the beginning of energization of coil terminal 114. In this example, in particular, a further 10 to 20 milliseconds elapse before contact plate 192 forms a closed electrical contact with positive-side contact 192 and drive-side contact 194. During this second time period, sliding armature 67 becomes pulled farther into coil assemblage 66, and drive pinion 26 either continues to be present at the end surface of the tooth set of ring gear 27 or, if a tooth gap in the tooth set of ring gear 27 has been "found," has already engaged to an undetermined engagement depth into ring gear 27.

During the second time period, and thus at the beginning of that second time period, the magnetic field of retraction winding 661 is dissipated. This magnetic field of first retraction winding 661 accounts, during the first time period, for approximately 15% of the total flux of coil assemblage 66. The shutoff of the first retraction winding results in a counter-induction in the other two coils through which current is flowing (second retraction winding 662 and holding winding 663). This causes the current through the two coils (second retraction winding 662 and holding winding 663) to be somewhat elevated for a short time. The second time period is followed by a third time period that begins at the moment the electrical contact is closed by way of contact plate 192. From that moment on, second retraction winding 662 is practically short-circuited. This is due to the fact that practically almost no voltage difference exists between positive pole + of starter battery 107 and positive terminal 106, and thus the positive side of second retraction winding 662 and the negative side of second retraction winding 662 have almost the same voltage applied to them. Even if there happens to be a minimal difference in voltage, the result is that the actual electromagnetic flux through second retraction winding 662 is no longer appreciable, and thus makes no contribution to the further progression of sliding armature 67. As soon as switching apparatus 191 closes, all that is significant in terms of the further retraction force of sliding armature 67 into coil assemblage 66 is the magnetic flux or magnetic field of holding winding 663.

What is disclosed is therefore a starting apparatus 1 for an internal combustion engine, having a drive pinion 26 for engagement into a ring gear 27 of the internal combustion engine, having an electrical rotary actuator 10 and an electrical linear actuator 19, rotary actuator 10 serving to rotate drive pinion 26 and linear actuator 19 serving to slide drive pinion 26, and electrical linear actuator 19 having a linear-stroke magnet 100 that has a sliding armature 67 that can be moved by a retraction winding 661, within retraction winding 661, along a sliding-armature axis 125. Linear-stroke magnet 100 furthermore has a holding winding 663 with which sliding armature 67 can be held in the retracted state; linear actuator 19 also serves to actuate a switching apparatus 191 by way of which electrical rotary actuator 10 can be switched into a second actuation stage. The second actuation stage of rotary actuator 10 begins when contact plate 192 has closed the electrical contact between positive-side contact 193 and drive-side contact 194. Present along with the one, first, retraction winding 661 is a second retraction winding 662 that is connected in parallel with first retraction winding 661. First retraction winding 661 can be shut off by a normally closed switch 120 while a current path through second retraction winding 662 is closed.

Provision is made in this context that with electrical linear actuator 19 in an activated position, switching apparatus 191 is closed and normally closed switch 120 of switching apparatus 191 is open. This is the case during the second time period. A current path to first retraction winding 661 is thus open when normally closed switch 120 of switching apparatus 191 is opened. Provision is made in this context that when the normally closed switch is opened, a current path through second retraction winding 662 is completed. In the first exemplifying embodiment, holding winding 663 is wound in the same direction as second retraction winding 662, and first retraction winding 661 is wound in the same direction as second retraction winding 662. In addition, a current path through first retraction winding 661 and a current path through second retraction winding 662 are or can be closed by a series contact 112. Holding winding 663, first retraction winding 661, and second retraction winding 662 are connected in parallel with one another.

Figure 4:
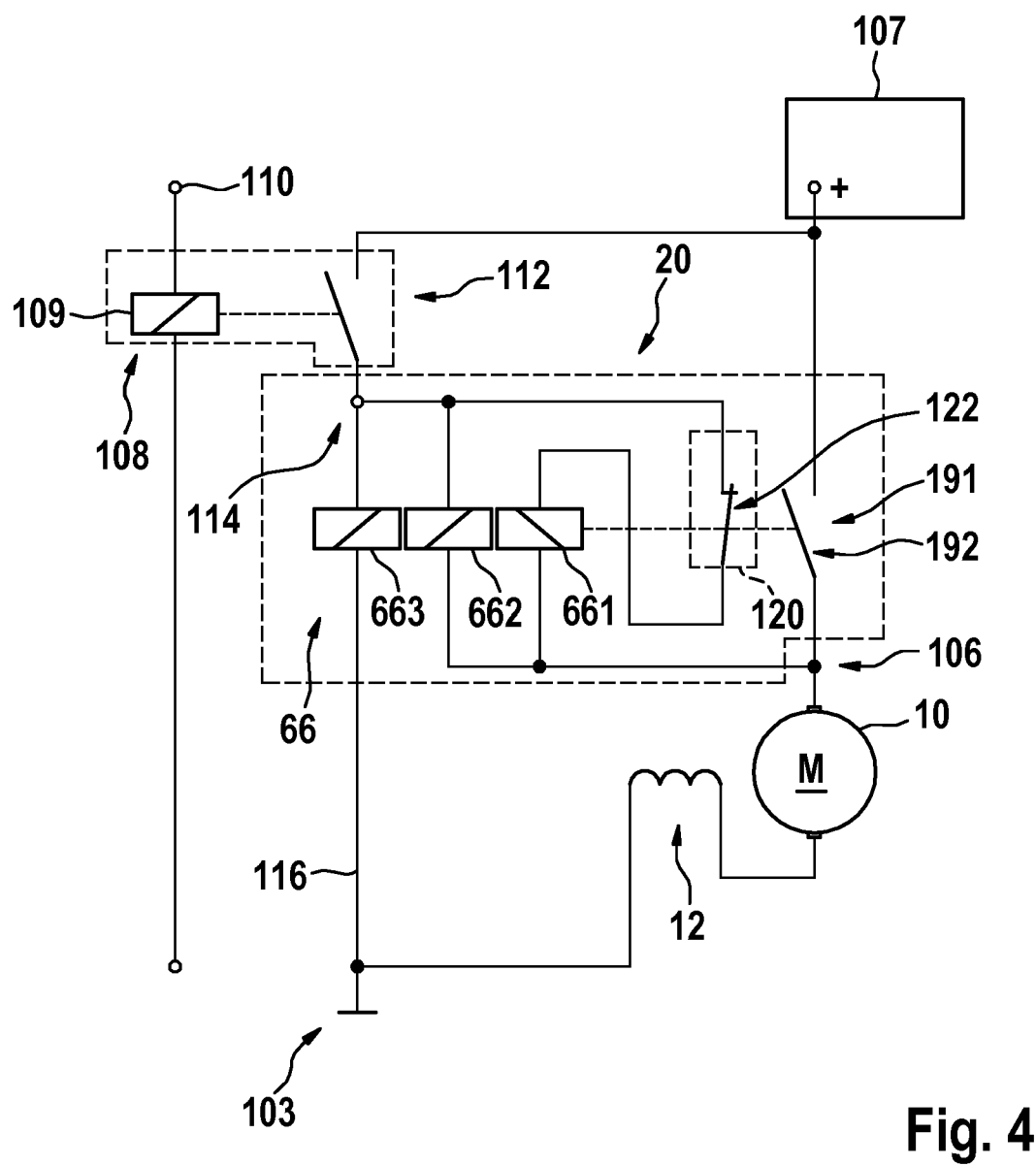
FIG. 4 is a second circuit diagram of an alternative exemplifying embodiment based on the first exemplifying embodiment, in accordance with the present invention.

FIG. 4 shows a circuit layout for a starting apparatus 1, which differs from the layout according to FIG. 3 only in that first retraction winding 661 has a different winding direction from second retraction winding 662 and holding winding 663. All further details correspond to those that are depicted in FIG. 3 and are described with reference thereto. It should be mentioned, however, that as a result of the accompanying counter-coupling of first retraction winding 661 with respect to the other two windings (retraction winding 662 and holding winding 663), the field of the latter becomes weakened. Here, for example, 50 to 70 milliseconds (i.e., a longer time than in the embodiment of FIG. 3) elapse before normally closed contact 122 is opened. After that opening, a further approximately 10 to 20 milliseconds elapse before switching apparatus 191 is closed by contact plate 192. A method for operating a starting apparatus 1 for internal combustion engines is therefore also provided in conjunction with what is described above, a drive pinion 26 for engagement into a ring gear 27 of the internal combustion engine being provided.

Electrical rotary actuator 10 and electrical linear actuator 19 are used in this method, rotary actuator 10 serving to rotate drive pinion 26, and linear actuator 19 serving to slide drive pinion 26. Electrical linear actuator 19 has a linear-stroke magnet 100 that has a sliding armature 67 that is movable by a retraction winding 661 inside retraction winding 661. Linear-stroke magnet 100 furthermore has a holding winding 663 with which sliding armature 67 can be held in the retracted state; linear actuator 19 also serves to actuate a switching apparatus 191 by way of which electrical rotary actuator 10 can be activated. After activation of starting apparatus 1, holding winding 663, second retraction winding 662, and first retraction winding 661 (connected magnetically reversely from the latter) are activated, and first retraction winding 661 is then shut off by a normally closed switch 120, while a current path through second retraction winding 662 remains closed. The method provides in particular that electrical rotary actuator 10 is energized via second retraction winding 662 and its intrinsic electrical resistance, and thereby drives a drive pinion 26.

Provision is further made in the context of the example method, in particular, that as a result of the activation and energization of holding winding 663, of first retraction winding 661, and of second retraction winding 662, sliding armature 67 is moved and a normally closed switch 120 is thereby opened. Provision is made in particular that as a result of the opening of normally closed switch 120, a current path through first retraction winding 661 is opened. Provision is preferably made that in the method, switching apparatus 191 is closed and a rotary-actuator-side terminal of second retraction winding 662 thereby becomes directly connected to a positive voltage potential of a starter battery.

A series relay 108 can also be embodied, using a semiconductor material, as an electronic switch having corresponding functionality. Series relay 108 could thus be regarded as an equivalent switch element that has the above-described properties of series relay 108. This also applies in the same way to switching apparatus 191 and to the normally closed switch that, once the series relay equivalent switch or series relay 108 is made conductive (coil arrangement 66 is activated), and after a specified time (timing element or computer switching unit), energizes first retraction winding 661 by way of an electronic equivalent switch (semiconductor switch) constituting normally closed switch 120. An electronic equivalent switch (semiconductor switch), constituting switching apparatus 191, can then be switched after a predefined time in order to create a current path from positive pole + of battery 107 to positive terminal 106 of rotary actuator 10.

What is claimed is:

1. A starting apparatus for an internal combustion engine, comprising:
   a drive pinion for engagement into a ring gear of the internal combustion engine;
   an electrical rotary actuator and an electrical linear actuator, the electrical rotary actuator being configured to rotate the drive pinion and the electrical linear actuator being configured to slide the drive pinion, the electrical linear actuator having a linear-stroke magnet that has a sliding armature that can be moved by a first retraction winding, within the first retraction winding, along a sliding armature axis, the electrical linear actuator further having a holding winding by which the sliding armature can be held in a retracted state, wherein the electrical linear actuator is also configured to actuate a switching apparatus using which the electrical rotary actuator can be activated into a second actuation stage, wherein the electrical linear actuator further includes a second retraction winding which is connected in parallel with the first retraction winding, such that the first retraction winding can be shut off by a normally closed switch of the switching apparatus while a current path through a second retraction winding is closed, wherein with the electrical linear actuator in an activated position, the switching apparatus is closed and the normally closed switch of the switching apparatus is opened.

2. The starting apparatus as recited in claim 1, wherein when the normally closed switch of the switching apparatus is opened, a current path to the first retraction winding is opened.

3. The starting apparatus as recited in claim 2, wherein when the normally closed switch of the switching apparatus is opened, the current path through the second retraction winding is closed.

4. The starting apparatus as recited in claim 1, wherein the holding winding is wound in the same direction as the second retraction winding, and the first retraction winding is wound either in the same direction as or in the opposite direction from the second retraction winding.

5. The starting apparatus as recited in claim 1, wherein a current path through the holding winding, a current path through the first retraction winding, and the current path through the second retraction winding can be closed by a series contact.

6. The starting apparatus as recited in claim 1, wherein the holding winding, the first retraction winding, and the second retraction winding are connected in parallel with one another.

7. A starting apparatus for an internal combustion engine, comprising:
   a drive pinion for engagement into a ring gear of the internal combustion engine;
   an electrical rotary actuator and an electrical linear actuator, the electrical rotary actuator being configured to rotate the drive pinion and the electrical linear actuator being configured to slide the drive pinion, the electrical linear actuator having a linear-stroke magnet that has a sliding armature that can be moved by a first retraction winding, within the first retraction winding, along a sliding armature axis, the electrical linear actuator further having a holding winding by which the sliding armature can be held in a retracted state, wherein the electrical linear actuator is also configured to actuate a switching apparatus using which the electrical rotary actuator can be activated into a second actuation stage, wherein the electrical linear actuator further includes a second retraction winding which is connected in parallel with the first retraction winding, such that the first retraction winding can be shut off by a normally closed switch of the switching apparatus while a current path through a second retraction winding is closed, wherein the linear actuator has a coil carrier, the first retraction winding being disposed in a first annular volume of a winding volume of the coil carrier, the second retraction winding being disposed in a second annular volume of the winding volume of the coil carrier and surrounding the first retraction winding with a portion of the annular volume, the holding winding being disposed in a third annular volume of the winding volume of the coil carrier and surrounding both the first retraction winding and the second retraction winding.

8. A method for operating a starting apparatus for an internal combustion engine, having a drive pinion that becomes engaged into a ring gear of the internal combustion engine, the starting apparatus having an electrical rotary actuator and an electrical linear actuator, the rotary actuator being configured to rotate the drive pinion, and the electrical linear actuator being configured to slide the drive pinion, and the electrical linear actuator having a linear-stroke magnet that has a sliding armature that is movable by a retraction winding within the retraction winding, the electrical linear actuator further having a holding winding by which the sliding armature is held in a retracted state, wherein the linear actuator is also configured to actuate a switching apparatus using which the electrical rotary actuator is activated, the method comprising:
   after activation of the starting apparatus, activating the holding winding, the first retraction winding, and a second retraction winding connected in parallel to the first retraction winding;
   after the holding winding, the first retraction winding, and the second retraction winding are activated, shutting off the first retraction winding by a normally closed switch of the switching apparatus while a current path through the second retraction winding remains closed.

9. The method as recited in claim 8, wherein the electrical rotary actuator is energized via the second retraction winding and its intrinsic electrical resistance, and thereby drives the drive pinion.

10. The method as recited in claim 8, wherein as a result of the activation and energization of the holding winding, of the first retraction winding, and of the second retraction winding, the sliding armature is moved and the normally closed switch of the switching apparatus is thereby opened.

11. The method as recited in claim 10, wherein as a result of the opening of the normally closed switch of the switching apparatus, a current path through the first retraction winding is opened.

12. The method as recited in claim 10, further comprising:
   closing the switching apparatus, a rotary-actuator-side terminal of the second retraction winding thereby becoming directly connected to a positive voltage potential of a power supply.

\* \* \* \* \*